United States Patent
Lipinski (10) Patent No.: US 9,322,489 B2
(45) Date of Patent: Apr. 26, 2016

(54) VALVE ASSEMBLY FOR PRODUCTION TANKS

(71) Applicant: TRINITY HIGH-TECH PRODUCTS LTD., St. Paul (CA)

(72) Inventor: John Lipinski, St. Paul (CA)

(*) Notice: Subject to any disclaimer, the term of this patent is extended or adjusted under 35 U.S.C. 154(b) by 278 days.

(21) Appl. No.: 13/941,332

(22) Filed: Jul. 12, 2013

(65) Prior Publication Data

US 2014/0014193 A1  Jan. 16, 2014

Related U.S. Application Data

(60) Provisional application No. 61/671,042, filed on Jul. 12, 2012.

(51) Int. Cl.
 *F16K 31/18* (2006.01)
 *F16K 31/20* (2006.01)

(52) U.S. Cl.
 CPC .............. *F16K 31/20* (2013.01); *Y10T 137/053* (2015.04); *Y10T 137/6004* (2015.04); *Y10T 137/7423* (2015.04)

(58) Field of Classification Search
 CPC ..... F16K 31/20; F16K 31/28; B01D 17/0214; B01D 17/045; B01D 17/0217; Y10T 137/053; Y10T 137/6004; Y10T 137/7423; Y10T 137/7426; Y10T 137/3034; Y10T 137/3006
 USPC ......... 137/15.26, 315.08, 172, 181, 429, 430, 137/409
 See application file for complete search history.

(56) References Cited

U.S. PATENT DOCUMENTS

| | | | | |
|---|---|---|---|---|
| 1,340,999 A | * | 5/1920 | Wilson | 137/425 |
| 1,463,129 A | * | 7/1923 | Milton et al. | 141/220 |
| 1,985,663 A | * | 12/1934 | Lowery | 137/399 |
| 2,130,611 A | * | 9/1938 | McCombs Burdick | 137/595 |
| 2,169,561 A | * | 8/1939 | Layne et al. | 137/172 |
| 2,570,372 A | * | 10/1951 | Parrish | 137/390 |
| 3,756,233 A | * | 9/1973 | Goldowsky | 604/254 |
| 3,822,715 A | * | 7/1974 | Rao | 137/140 |
| 4,055,499 A | | 10/1977 | Laxo | |
| 4,132,238 A | * | 1/1979 | Clark | 137/172 |
| 4,589,442 A | * | 5/1986 | Ernryd | 137/546 |
| 5,918,622 A | * | 7/1999 | Perez | 137/172 |
| 2005/0046187 A1 | * | 3/2005 | Takeuchi et al. | 285/348 |
| 2007/0017674 A1 | * | 1/2007 | Blaisdell | 166/264 |
| 2013/0087208 A1 | | 4/2013 | Schlekewy et al. | |
| 2013/0087220 A1 | | 4/2013 | Schlekewy et al. | |

FOREIGN PATENT DOCUMENTS

| | | |
|---|---|---|
| GB | 518346 A | 2/1940 |
| WO | WO 2013/049937 A1 | 4/2013 |

* cited by examiner

*Primary Examiner* — Craig J Price
(74) *Attorney, Agent, or Firm* — Parlee McLaws LLP (CGY); Sean Goodwin (57) ABSTRACT

A float valve assembly is provided which can be remotely retrofit to a pipe end located in a production tank. The valve assembly comprises a guide rod disposed axially in the valve assembly. A floating valve element of the valve assembly is coupled to the guide rod and is moveable with or axially along the guide rod. The valve assembly is remotely mounted on the pipe end by temporarily associating an installation tool with the guide rod to locate a fitting adapter of the valve assembly over the pipe end for sealably fitting the valve assembly to the pipe end. The guide rod can also be manually manipulated for moving the valve element away from the pipe end and locking the valve element in the open position for permitting flow of liquid through the pipe end. A method for manually locking the valve element in the open position is also provided.

21 Claims, 8 Drawing Sheets

VALVE ASSEMBLY FOR PRODUCTION TANKS

CROSS REFERENCE TO RELATED APPLICATIONS

This application claims the benefits under 35 U.S.C 119(e) of U.S. Provisional Application Ser. No. 61/671,042, filed Jul. 12, 2012, which is incorporated fully herein by reference.

FIELD

Embodiments described herein relate to a valve assembly for controlling flow of liquid through a pipe end intake located in a production tank. More particularly, embodiments described herein relate to a valve assembly which can be retrofit to a pipe end easily, safely, with minimal effort and which can be manually manipulated to permit liquid to flow through the pipe end.

BACKGROUND

In the oil and gas industry a production tank is located on a well site for receipt of well production fluids when not otherwise directly tied into a pipeline system. In another situation, production tanks are located at a facility site to temporarily hold production fluids either before or after processing. A tank truck is used to transport the production fluid between production tanks or from one production tank at a well site to another production tank at a facility.

Typical production fluid is oil, water, solids and gas. The tank is monitored by the field operation staff and the production fluid is removed as and when required. Tank level monitoring systems are commonly used to monitor and control the fluid levels in such tanks and vessels.

There is often also an accumulation of water in the tank in addition to oil. The lighter gravity oil floats on the water. Accordingly, for production inlets at fixed elevations, the water has to be drawn off first before accessing the oil stored thereabove. A water or waste truck is employed to first remove the water. Unfortunately, there is a risk that the truck overdraws the water and also takes some of the valuable oil. Accidentally drawn oil is lost to disposal with the waste water at significant cost.

Thus it is known to provide an intake valve to a discharge line employing a floating valve element which engages or disengages from a valve seat in response to specific gravity of the liquid contained in the tank. The floating valve element floats in water, to maintain an open intake, and sinks in the lighter oil, closing the intake to avoid drawing product oil. An example of such a valve is described in PCT Application Publication No. WO 2013/049937 to Reconeco and EP Patent No. 518,346 to Bywater. Both documents disclose a cage housing a floating valve element and a valve seat. The valve element floats in water and if the water is above the valve seat, floats above from the valve seat for permitting flow of water through the pipe end. In oil, the floating valve element sinks, engaging the valve seat and prevents the oil from flowing through the pipe end. The valve modulates between an oil and water interface. Such an intake valve is effective but has some shortcomings.

In one aspect, existing tank inlets, such as 11.4 and 8.9 cm pipe ends, are simply open ended and need retrofitting with a valve. To access the pipe end, personnel are required to enter the tank. The pipe end can be located over 6.1 meters below an access hatch, requiring full entry into the tank. As the tank is an enclosed space, housing hydrocarbons and possibly hazardous vapours and gas, regulations require a full cleaning operation before access. Further, the tank contents are typically heated, such as by using steam tracing, resulting in temperatures of 60-85° C. within the tank.

For example, several days can be required for preparing the tank for entry by personnel to retrofit the pipe end with the valve assembly. The preparation process involves draining of the tank, a desanding operation, steaming, erecting of scaffolding for a welder to access the pipe end for welding of the valve to the pipe end. The entire process can cost about $10,000 to $40,000. The expense is almost equivalent to the cost of lost production for two days at typical production rates of 20-30 $m^3$/d. Further, when back in production, if the valve element becomes stuck to the valve seat, and cannot be dislodged with backflow manipulation, then the process must be repeated for tank access and repair.

The existing floating valve elements are permanently enclosed within an elongate wire cage. Typically, the valve elements have a specific gravity based on a standard oil gravity for control of oil-water interfaces in many situations. However, not all oil gravities are alike, possibly resulting in a valve element that is too light to close in a timely manner before loss of valuable production oil.

There is a demonstrated need for a more effective methodology for retrofitting of an intake valve to a pipe end and a more reliable valve for minimizing loss of oil with waste water.

SUMMARY

Embodiments described herein relate to a valve assembly which can be retrofit to a pipe end of a discharge line located in a production tank with minimal intervention by personnel. This is achieved by modifying the valve to enable it for association with an installation tool for remotely locating it over the pipe end.

The valve assembly disclosed herein can also be manipulated to disengage a floating valve element of the valve assembly that has stuck to a valve seat and temporarily park or maintain the valve element away from the valve seat to manually permit flow of liquid through the pipe end.

The valve assembly disclosed herein is also provided with a fitting adapter which aids in remote location of the valve assembly over the pipe end. The fitting adapter also enables the valve assembly to be located over pipe ends of various diameters.

The valve assembly is also provided with means for altering an effective specific gravity of the valve element to correspond to a specific gravity of a liquid contained in the tank for efficient functioning of the valve element.

Accordingly in one broad aspect a valve assembly for a pipe end immersed in a liquid is provided. The valve assembly comprises a floating valve element associated with a guide structure such that the valve element can float vertically in the liquid. A fitting adapter is connected at a connection end of the guide structure. The fitting adapter comprises a valve portion and a pipe end portion. A valve seat for the valve element is defined within the valve portion of the fitting adapter. The valve assembly is located over the pipe end by sealably fitting the pipe end portion of the fitting adapter over the pipe end. The valve element is floatable and is operable between a closed position, at which the valve element is seated on the valve seat for preventing flow of a liquid through the pipe end, and an open position, at which the valve element is unseated from the valve seat for permitting flow of the liquid through the pipe end.

Accordingly in another broad aspect a float valve assembly for a pipe end is provided. The valve assembly comprises a tubular cage comprising a connection end and a closed end. The closed end is closed with a closing member. The cage further comprises a spring connected to an inside surface of the closing member. The valve assembly further comprises a guide rod disposed axially in the cage. The guide rod is operably coupled to a floating valve element such that the valve element can float and move vertically within the cage. One end of the guide rod protrudes out of the cage through an opening in the closing member is and moveable therethrough. The guide rod further comprises a stop located below the valve element for de-limiting axial movement of the valve element along the guide rod and a laterally extending tab located above the valve element. The closing member further comprises a cut-out extending radially from the opening and corresponding to the tab. The valve assembly also comprises a valve seat associated with the valve element located about the connected end. The valve assembly is sealably located over the pipe end at the connection end. The tab on the guide rod is aligned with the cut-out in the closing member and the valve element is manually moved away from the valve seat for permitting flow of liquid through the pipe end by lifting the guide rod and pulling the valve element away from the valve seat to the open position. Upward movement of the valve element compresses the spring and pushes the tab through the cut-out. The valve element is locked in the open position by rotating the guide rod after the tab has passed through the cut-out to misalign the tab with the cut-out on an outer surface of the closing member.

Accordingly in another broad aspect a method for remotely installing a float valve assembly to a pipe end located in a tank comprising liquid is provided. The method comprises lowering the valve assembly into the tank through an access in the tank and locating a fitting adapter of the valve assembly over the pipe end with a floating valve element portion of the valve assembly thereabove. The valve element can be manually spaced away from the pipe end by manipulating one end of a guide rod protruding out of a cage of the valve assembly and operably coupled to a floating valve element for spacing the valve element away from the pipe end to an open position for permitting flow of liquid through the pipe end. The valve element can be further locked in the open position.

BRIEF DESCRIPTION OF THE DRAWINGS

FIGS. $2A_1$, 2B and 2C are cross-sectional illustrations of one embodiment of a valve assembly, FIG. $2A_1$ illustrating a closed position of a floating valve element of the valve assembly; FIG. 2B illustrating a position where the valve element is in the process of being unseated from a valve seat of the valve assembly towards an open position or floating position, FIG. 2C illustrating the open position of the valve element;

FIG. $2A_2$ is a top view of a closing member of the valve assembly of FIG. $2A_1$;

DESCRIPTION OF THE PREFERRED EMBODIMENTS

Embodiments described herein relate to a valve assembly which can be remotely retrofit to a pipe end of a discharge line located in a production tank, the fitting being achieved without a need for personnel entering the production tank. Further various arrangements of a floating valve element and means to guide the valve element are discussed.

Embodiments described herein also relate a method for mounting the valve assembly to the pipe end.

Figure 1:
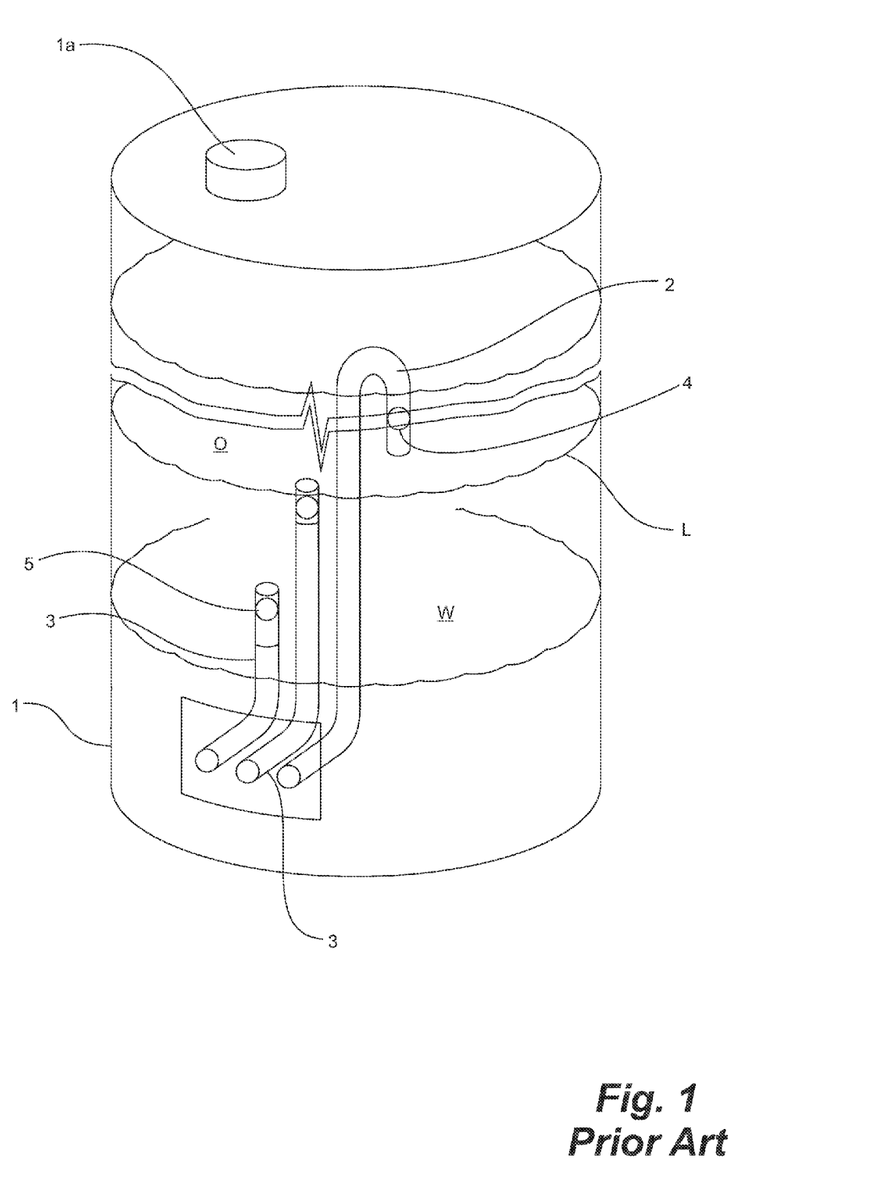
FIG. 1 is a perspective view of a production tank, according to the prior art, illustrating the tank internals having a plurality of pipe ends therein, each pipe end being fitted with a prior art intake valve.

FIG. 1 illustrates a prior art production tank 1 filled with liquid L and comprising various discharge lines, at different elevations, having pipe ends fit with valves. The pipe ends are normally immersed in the liquid L. Typically, the liquid L is a layering of dissimilar specific gravity liquids such as water W and oil O. The pipe ends may be oriented upwardly or downwardly. In FIG. 1, the downwardly oriented pipe end is an oil intake 2 for an oil discharge line and the two upwardly oriented pipe ends are water intakes 3 for water discharge lines. The oil intake 2 is fit with a hanging valve 4 and the water intakes 3 are fitted with upstanding valves 5.

The valves 4, 5, comprise a floating valve element and are based on the technology described in PCT Application Publication No. WO 2013/049937 to Reconeco and EP Patent No. 518,346 to Bywater. The valve element floats in water to block or open the pipe ends 2, 3 (depending on the orientation of the pipe end) and sinks in oil to open or block the pipe ends 2, 3, respectively for permitting or preventing flow of liquid L through the pipe ends 2,3. A typical tank 1 might have a lowest intake at an elevation of about 0.3 to about 0.9 meter from the bottom of the tank, an intermediate offloading intake at about 1.5 to 2.1 meter and a production oil intake at about 2.8 to 3.4 meters.

FIGS. 2A-6C illustrate various aspects of a float valve assembly 6 according to embodiments described herein. Working of the valve assembly 6 is based on a vertically guided, floating movement of a floating valve element for permitting or preventing flow of liquid through a pipe end.

The mounting and assembly of the float valve assembly 6 are described explained with reference to the upwardly oriented pipe end 3.

With reference to FIGS. $2A_1$ to 2C, and 4A to 5C, detailed description of the float valve assembly 6, is as follows: the valve assembly 6 comprises a guide structure for guiding a floating valve element up and down.

Figure 2A:
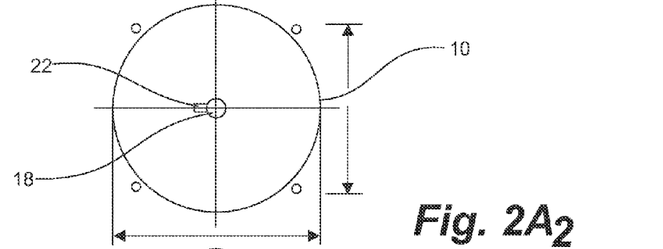
Figure 2A:
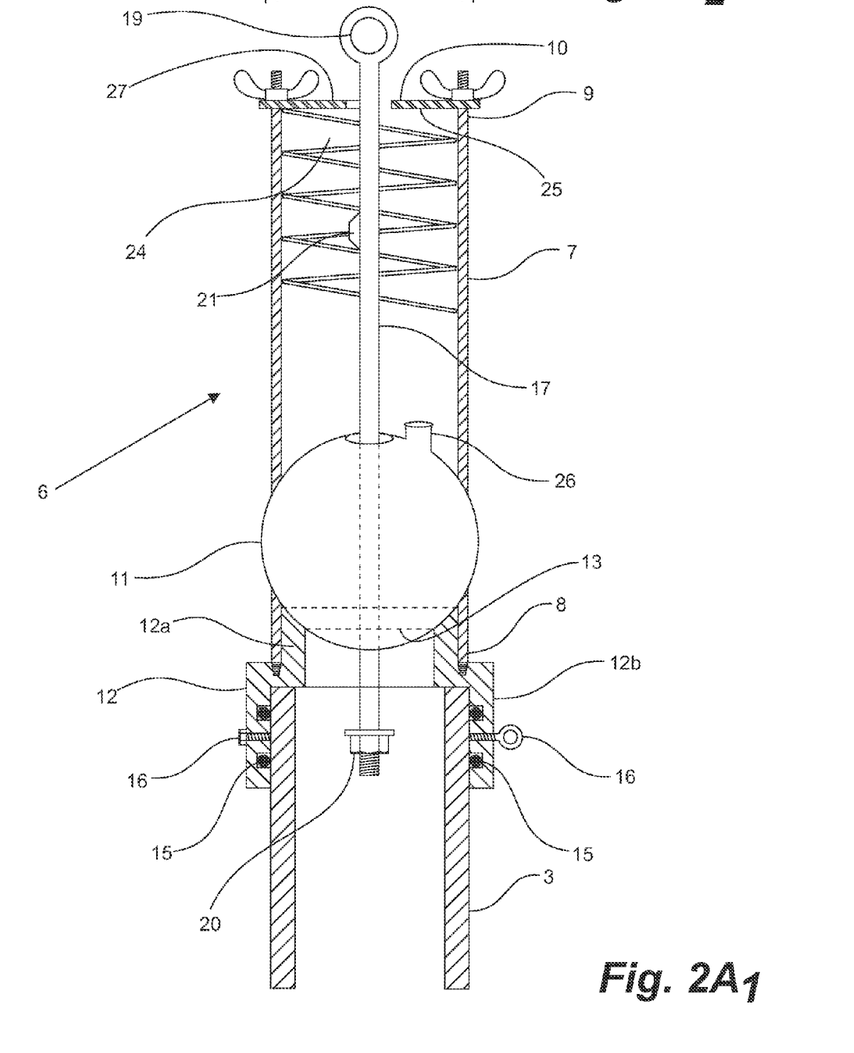
Figure 2B:
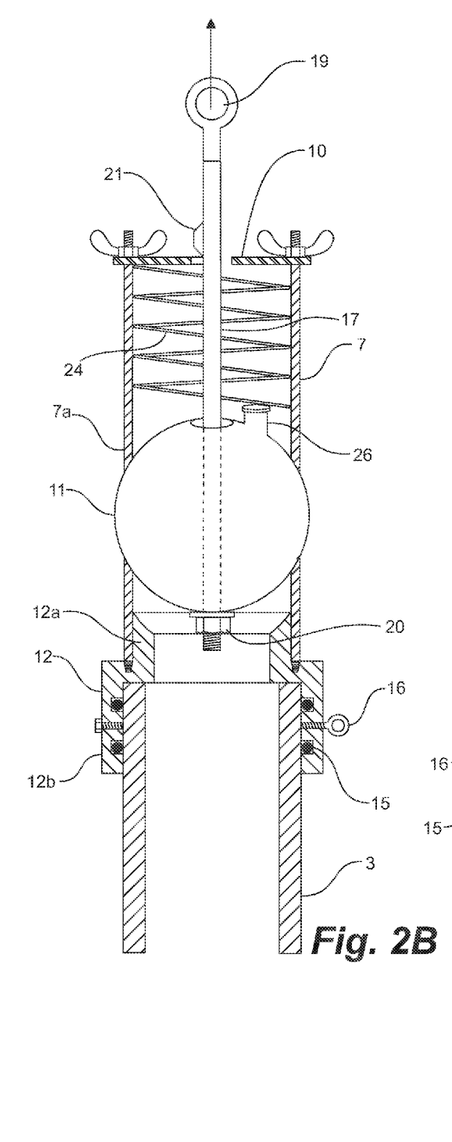
Figure 2C:
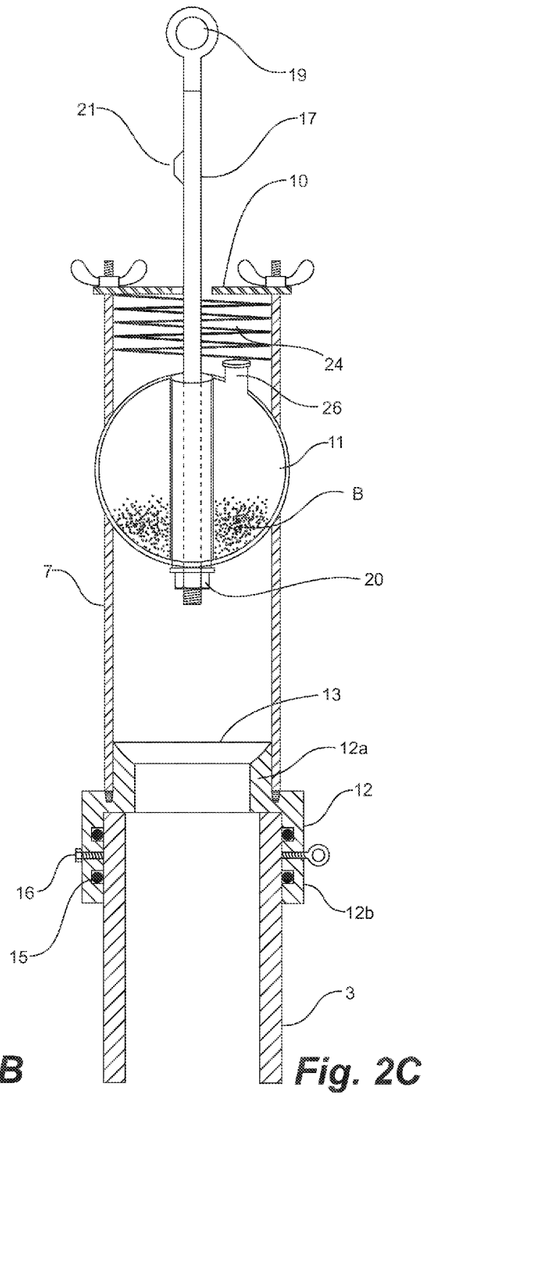

In this embodiment, the guide structure is a tubular cage 7 comprising a connection end 8 and a closed end 9. The closed end 9 is closed with a closing member or covering lid 10. In one embodiment, the closing member 10 is a top plate. A floating valve element is disposed within the tubular cage 7. In one embodiment, the floating valve element is a stainless steel hollow ball 11. The ball 11 can float and move vertically within the tubular cage 7 between the connection end 8 and the closing member 10. The closing member 10 de-limits the vertical movement of the ball 11 within the cage 7. As known by those skilled in the art, the range of delimited motion is sufficient to enable flow through the pipe end 3 without significantly influencing the ball 11.

In one embodiment, the cage 7 comprises three or more rods, typically four rods 7a, extending axially from the connection end 8 and having a chord spacing C therebetween which is less than that of the ball diameter D (FIG. 2B). The rods 7a, are removeably secured to the closing member 10, such as with threaded ends and nuts, wingnuts or the like, aiding in removal of the closing member 10 and replacement of the ball 11 without destructive disassembly of the valve assembly 6.

The valve assembly 6 further comprises a fitting adapter 12 coupled to the connection end 8 of the tubular cage 7. The fitting adapter 12 comprises a valve portion 12a and a pipe end portion 12b. In one embodiment, a valve seat 13 for the ball 11 is defined within the valve portion 12a of the fitting adapter 12. In one embodiment, the valve seat 12 has a spherical profile to match a spherical profile of the ball 11. The pipe end portion 12b is tubular and comprises a bore 14 for passage of liquid therethrough. The bore 14 has an inner diameter corresponding to an outer diameter of the pipe end 3 for fitment thereover.

The valve assembly 6 is mounted over the pipe end 3 by locating the pipe end portion 12b coaxially over the pipe end 3 and pressing the valve assembly 6 down axially so that the pipe end 3 is received into the bore 14.

The fitting adapter 12 is sealably fitted to the pipe end 3 by providing at least one annular sealing element in the bore 14. In one embodiment, the annular sealing element is an O-ring 15 fit within one or more annular grooves 15a for receiving the O-ring 15 (seen in FIGS. 4A to 5C). During fitment, the O-ring forms a tight seal between the pipe end portion 12b and the pipe end 3.

Figure 5A:
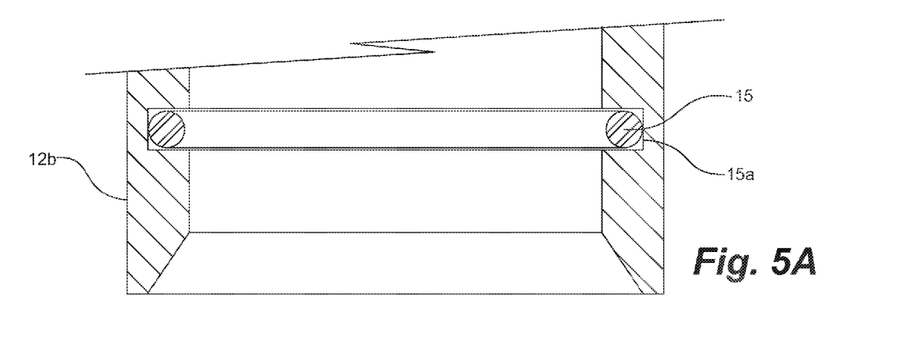
FIGS. 5A, 5B and 5C are partial cross-sectional views illustrating a groove and an annular seal of the fitting adapter before exposure to tank liquids and changes to a shape of the annular seal, FIG. 5A showing the shape of the annular seal before the adapter is fitted over the pipe end, FIG. 5B showing the shape of the annular seal after the adapter is fitted over the pipe end and FIG. 5C showing the shape of the annular seal after swelling upon contact with liquid contained in the tank.
Figure 5B:
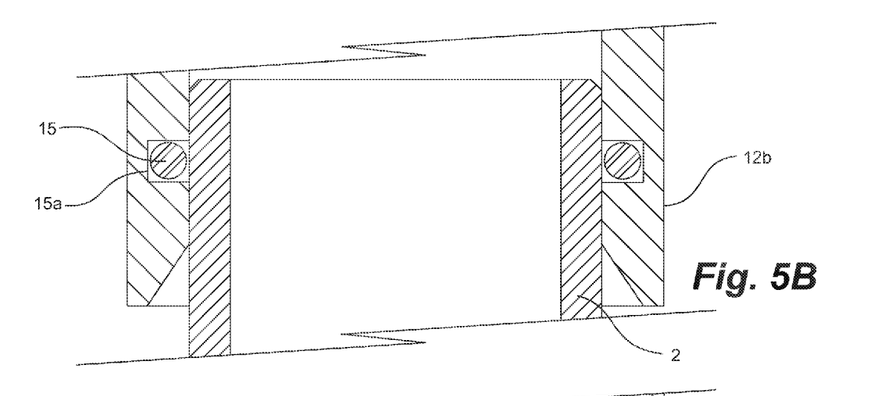
Figure 5C:
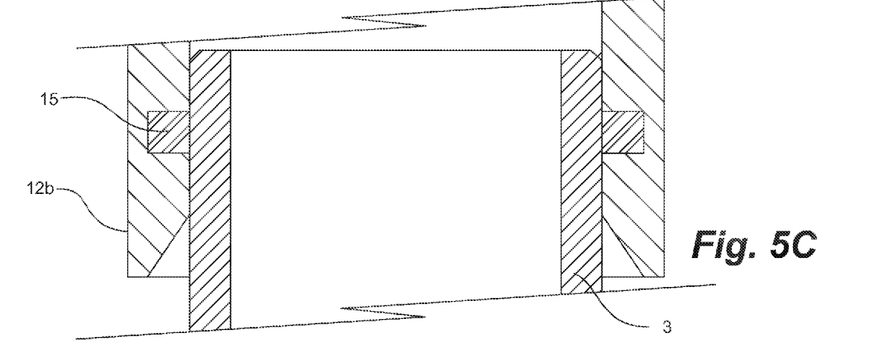

In one embodiment, with reference to FIGS. 5A to 5B, the O-Ring 15 is made of ethylene propylene diene terpolymer (EPDM) water-swellable rubber (WSR). As shown in FIG. 5A, the O-ring 15 is initially loosely fit in the annular groove 15a. The O-ring has an inner diameter generally that of, or about that of, the pipe end 3 for ease of installation thereon. Typically, an O-ring having an inner diameter of about 1.3 or about 1.6 centimeter is suitable for standard pipe ends of 8.9-11.4 centimeters. In FIG. 5B, the fitting adapter 12, fitted with the O-ring 15, is installed over the pipe end 3. Dry, the O-ring 15 does not form a particularly good seal. However, once exposed to the liquid L (oil or water) in the production tank 1, as shown in FIG. 5C, the water swellable O-ring material swells and forms a tight seal between the pipe end portion 12b and the pipe end 3. The swollen O-ring 15 fills the annular groove 15a and compresses against the pipe end 3 to form a tight seal therebetween. The fictional engagement is typically sufficient to retain the valve assembly 6 to the pipe end 3.

As shown in at least FIGS. $2A_1$, 2B and 2C, in order to further reinforce the engagement between the fitting adapter 12 and the pipe end 3, mechanical engagement means 16 such as set screw, bolts or eyebolts, rotated using remote tools, can be used to lock the pipe end portion 12b to the pipe end 3.

With reference to FIGS. $2A_1$, 2B and 2C, in another embodiment, the valve assembly 6 is further provided with a guide rod 17. The guide rod 17 can be used for manually manipulating movement of the ball 11. An upward pull of the guide rod 17 can unseat a ball stuck to the valve seat 13. The guide rod 17 can also serve as an aid in remote location of the valve assembly 6 over the pipe end 3 from outside the tank 1. The ball 11 can be moveable along, or moveable with the guide rod 17.

As shown in FIGS. $2A_1$, 2B and 2C, the ball 11 is axially moveable along the guide rod 17. In another embodiment, shown in FIGS. 3A and 3B, the guide rod 17 is integral with the ball 11 for co-movement therewith, moving as a single element. Structural and operational aspects of the guide rod 17 are explained herein with reference to FIGS. $2A_1$ to 3B and FIGS. 6A to 6C.

The guide rod 17 enables other geometry of floating valve elements, other than spherical, to be coupled thereto as long as a lateral section of the floating valve element matches the valve seat 13. A circular section is expected to be most reliable, although circular can be achieved with a sphere or an ellipsoid form of floating valve element aligned axially along its major axes.

The guide rod 17 is disposed axially in the tubular cage 7. With reference to FIGS. $2A_1$ to 3B, the ball 11 is coupled to the guide rod 17 such that the ball 11 can either move with the guide rod 17, or can be guided by the guide rod 17 for moving axially therealong.

During normal operation of the valve assembly 6, the ball 11 is guided along the guide rod 17 between an unseated or open position and a seated or closed position. One end 17a of the guide rod protrudes out of the tubular cage 7 through an opening 18 (best seen in FIG. $2A_2$) in the closing member 10. Manual movement of the ball 11 towards or away from the valve seat 13 can be achieved by manipulating the guide rod 17. In this mode, the guide rod 17 is manipulated to move the ball 11 with the guide rod 17 as one unit (best seen in FIG. 2B). In one embodiment, a first manipulating end 17a is provided with a connector 19 such as a fish neck or eye. At an opposing or second end, the guide rod 17 is further provided with a de-limiting stop 20 for engaging a bottom of the ball 11 and arresting axial movement of the guide rod 17 therethrough. Thus, the ball 11 has a delimited movement between the stop and a top of the cage 7.

Above the ball 11, the guide rod 17 is also provided with a laterally extending tab 21. The opening 18 of the closing member 10 is also provided with a radially extending cut-out 22 (best seen in FIG. $2A_2$) having a width that corresponds to a width and lateral extent of the tab 21. When rotationally aligned, the tab 21 can pass through the cut-out 22 as required. In one embodiment, the tab 21 is trapezoidal in cross-section, having sloped shoulders, to aid in guiding and alignment with the cut-out.

Mounting of the Valve Assembly 6

Figure 6A:
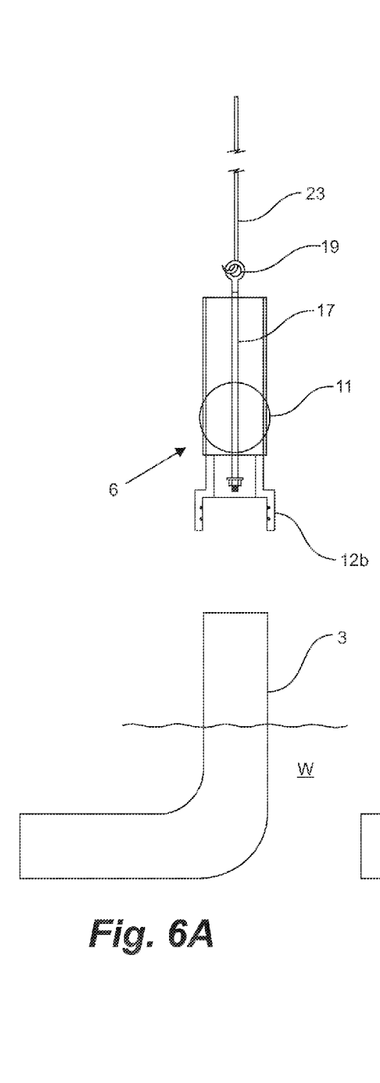
FIGS. 6A, 6B and 6C are cross-sectional views of a valve assembly and pipe end during sequential steps involved in mounting the valve assembly over the pipe end, FIG. 6A illustrating lowering of the valve assembly with an installation tool, FIG. 6B illustrating location and fitment of the valve assembly over the pipe end, and FIG. 6C illustrating the valve assembly immersed in the liquid contained in the tank for operation.
Figure 6B:
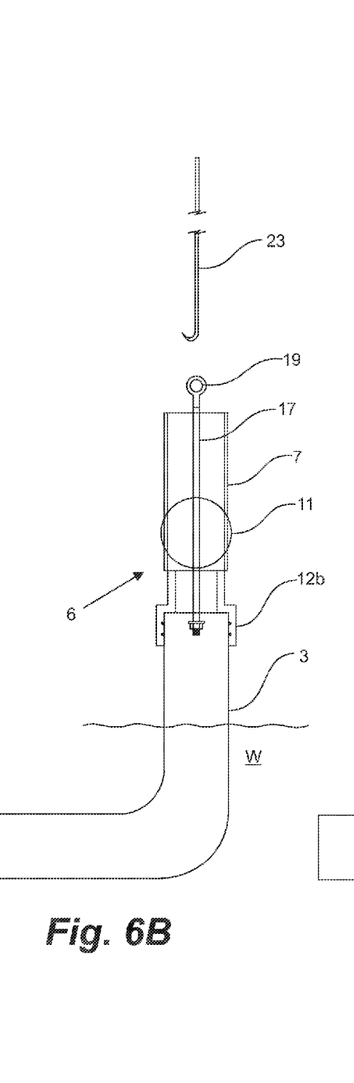
Figure 6C:
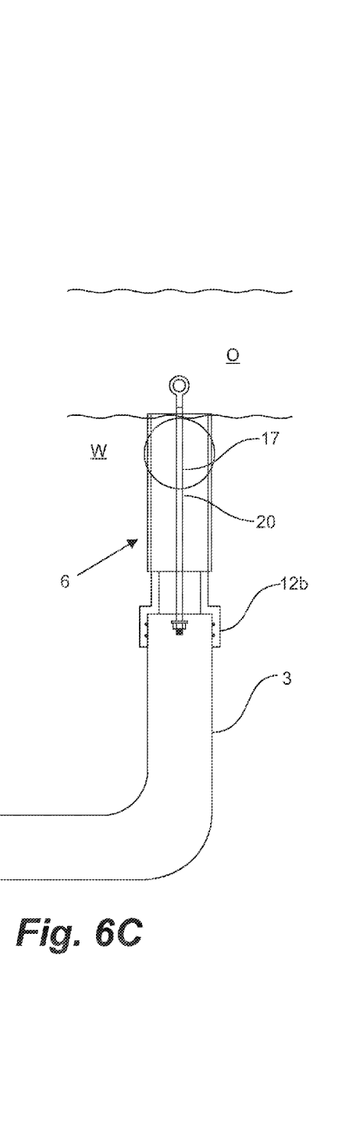

Remote mounting of the valve assembly 6, without a need for personnel entering the tank 1, is described with reference to FIGS. 6A to 6C. The valve assembly is remotely mounted to the pipe end 3, located in the production tank 1, as follows: level of the liquid L in the tank 1 is typically lowered sufficiently to view the pipe end 3. An installation tool 23 is connected to the connector 19 on the guide rod 17 for temporarily supporting the valve assembly 6 on the installation tool. The installation tool 23 and the valve assembly 6 supported thereon are both lowered into the tank 1 through an access 1a in the tank 1 for locating the fitting adapter 12 over the pipe end 3 such that the valve element 11 is located above the pipe end 3. The bore 14 of the fitting adapter 12 is aligned with the pipe end 3 and the fitting adapter 12 is pressed down axially over the pipe end 3 using the installation tool 23. The pipe end 3 is received in the bore 14 and the O-ring 15 in the bore is indexed over the pipe end 3. The installation tool 23 is then disengaged from the guide rod 17 and retrieved from the tank 1. The tank 1 is refilled with the liquid L. The O-ring 15, on contact with the liquid L, will swell to firmly grip the pipe end 3 and to form a sealable connection between the fitting adapter 12 and the pipe end 3. In one embodiment, the valve assembly 6 is further locked to the pipe end 3 by tightening set screws 16 using the installation tool.

In order to ensure a tight fit between the fitting adapter 12 and the pipe end 3, a fitting adapter 12 is selected whose bore 14 has an inner diameter corresponding to an outer diameter of the pipe end 3.

The same fitting adapter 12 can be used to fit pipe ends of different diameters by providing two or more stepped inner diameters in the bore 14. One fits at least one stepped inner diameter with one or more O-rings 15 for sealable engagement with a corresponding pipe end. The multi-diameter bore 14 for fits various sized pipe ends. This is achieved by aligning the bore 14 over the pipe end 3 and pressing the fitting adapter 12 down over the pipe end 3 until a corresponding steeped inner diameter engages the pipe end 3 for sealable engagement therewith. If the diameter of the pipe end 3 is known, just the corresponding inner diameter can be fit with seals.

This method of remote mounting, eliminates the need for personnel to enter the tank for fitment of the valve assembly 6 over the pipe end 3. Expensive cleaning and preparation of the tank 1 for readying it for the fitment operation is not required. The remote mounting operation is quick and safe to perform and does not involve complicated tools or machinery. Therefore, remote location of the valve assembly 6 overcomes the problems associated with prior art valve mounting methods.

Operation of the Valve Assembly

The valve assembly 6 incorporates a float element 11 that is sensitive to the liquid gravity, finding an equilibrium between water and oil. In one embodiment shown in FIGS. $2A_1$, 2B and 2C, an effective specific gravity of the ball 11 is adjustable. The effective specific gravity of the valve element 11 is such that the valve assembly 6 cycles or modulates between an open position and closed position in response to specific gravity of the liquid L contained in the tank 1. In the open position, relatively high specific gravity liquid L, such as water, flows through the pipe end 3 and as the water level drops to the guide structure, the valve element sinks in the lighter liquid above the water, moving to the closed position, preventing further liquid L from flowing through the pipe end. As explained above, the liquid L is typically a stratification or layering of a lighter second liquid such as a valuable oil over a heavier second liquid such as water.

In one embodiment, the ball 11 is a specific gravity-sensitive floating element and buoyancy or an effective specific gravity of the ball 11 is selected such that it is less than a heavier, first liquid such as water enabling it to float in water and greater than a lighter, second liquid such as oil enabling it to sink in oil. During working of the valve assembly 6, the ball 11 is operable between a closed position, at which the ball 11 is seated (FIG. $2A_1$) on the valve seat 13 for preventing flow of oil through the pipe end 3, and an open position (FIG. 2C), at which the ball 11 is unseated from the valve seat 13 for permitting flow of water through the pipe end 3.

As shown in FIGS. $2A_1$ to 2C, a spring 24 is connected to an inside surface 25 of the closing member 10 for, in one embodiment, to dampen vertical movement of the ball 11 towards the closing member 10 when the ball 11 is manually unseated from the valve seat 13 using the installation tool 23. Dampening minimizes damage to the ball 11 and the closing member 10 thereby increasing its life.

In order to ensure proper functioning of the ball 11 in oils of different specific gravities, the valve assembly 6 is provided with means for altering an effective specific gravity of the ball 11 to match the specific gravity of the oil it is immersed in. In FIGS. $2A_1$ to 2C, the ball is freely moveable on the guide rod 17 and thus variance of the effective specific gravity is effected through change in the mass of the ball. One can add or remove ballast B (FIG. 2C) to a given or fixed volume of the ball 11, through an access port 26 provided on the ball 11. Suitable ballast B includes sand, lead pellets, or other material.

Figure 3A:
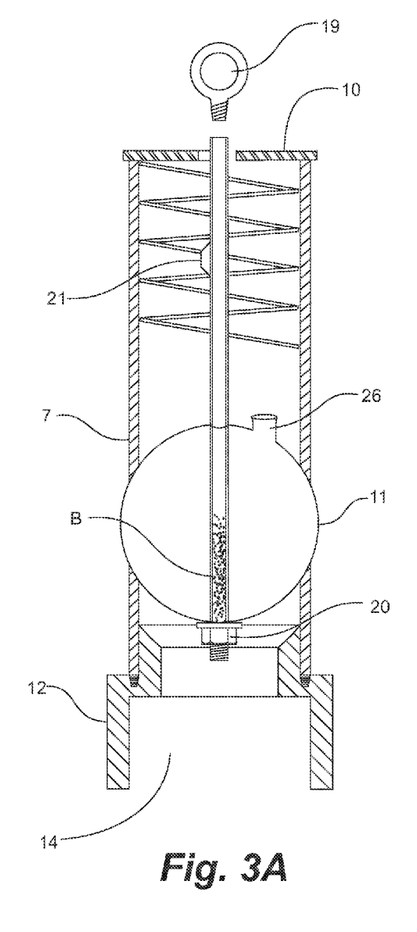
FIGS. 3A and 3B are cross-sectional illustrations of another embodiment of a valve assembly, FIG. 3A illustrating a floating valve element and integrated guide rod for co-movement, the guide bar being weight adjustable and the valve element in a closed position, and FIG. 3B illustrating a floating or open position of the valve element.
Figure 3B:
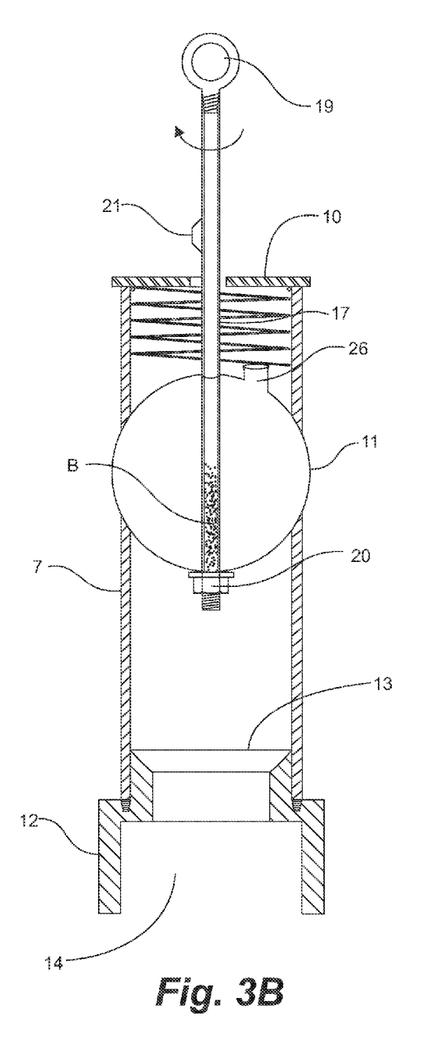

With reference to FIGS. 3A and 3B, in another embodiment, the ball is moveable with the guide rod 17 as a single element and the effective specific gravity of the single element (guide rod together with the ball) can be altered by adding or removing ballast B (FIGS. 3A and 3B) to either the ball 11 or to a given volume of the guide rod 17 combined with the volume of the ball 11. In this embodiment, the guide rod 17 is a hollow conduit and the ballast can be added or removed from the guide rod 17 through an access port provided on the guide rod 17. In one embodiment, the connector 19 is connected (FIG. 3A) to the guide rod through a threaded engagement enabling removal of the connector 19 from the guide rod 17 for introduction or removal of ballast B from the hollow guide rod 17. In the embodiments shown in FIGS. 3A and 3B, the ball 11 is secured to the guide rod 17 such that the ball 11 and the guide rod 17 move as a single unit during normal operation of the valve assembly 6 and when the guide rod 17 is manually manipulated to force axial movement of the ball 11 in the cage 7.

Altering the effective specific gravity of the valve element 11 results in the valve element 11 being appropriately weighted to sink in the oil in a timely manner to close the valve seat 13. This prevents loss of valuable production oil through the pipe end 3.

During operation, if the ball 11 were to become stuck to the valve seat 13, closing the pipe end 3, the guide rod 17 can be manipulated to disengage the ball 11 from the valve seat 13. This is done by temporarily coupling the installation tool 23 or like extended tensile tool to the connector 19 on the guide rod 17. The guide rod 17 is manually lifted using the installation tool 23. Lifting of the guide rod 17, lifts the ball 11 coupled to the guide rod 17 and spaces it away from the valve seat 13 (FIG. 2B shows the ball 11 in the process of being lifted). The ball 13 can be locked in the open position away from the valve seat 13 by aligning the tab 21 with the cut-out 22 in the closing member 10 so that the tab 21 passes through the cut-out 22. After the tab 21 passes through the cut-out 22 (FIG. 2A), the guide rod 17 is rotated about its axis to misalign the tab 21 with the cut-out 22 on an outer surface 27 of the closing member 10 to prevent downward movement of the guide rod 17 and the ball 11 towards the valve seat 13. The ball 11 is thus retained in the open position, spaced away from the valve seat 13. Accordingly, the ball 11 can be manually spaced from the valve seat 13 using the guide rod 17 irrespective of the type or level of the liquid L in which the ball 11 is immersed thus forming an effective override mechanism.

During normal operation of the valve assembly 6, the ball moves vertically within the cage 7 and modulates between an open position, up to the relaxed spring, and closed position in response to specific gravity of the liquid L contained in the tank 1. The tab 21 on the guide rod is always located within the cage 7 during normal gravity modulation operation of the valve assembly 6. When the guide rod 17 is manually lifted (override mode) for spacing the ball 11 from the valve seat 13, the upwardly moving ball 11 compresses the spring 24. Against the force of the spring 24, the tab 21 is forcibly lifted out of the cage 7 through the cut-out 22 for rotation and locking the ball 11 in the open position. During normal operation, the ball 11 can contact the spring 24 in the process of attaining the open position. However, buoyancy of the ball 11 does not exert sufficient compressive forces on the spring 24 to lift the tab 21 out of the cage 7 and through the cut-out 22 avoiding accidental locking of the ball 11 in the open position.

In one embodiment, the ball 11 is of a hollow construction and is made of a metal, such as stainless steel. A stainless steel ball is less susceptible to the buildup of static electricity, which can occur using conventional nitrile balls. In the unlikely case of an explosive atmosphere, the stainless steel ball 11 will thus not form a source of ignition.

Figures 4A, 4B:
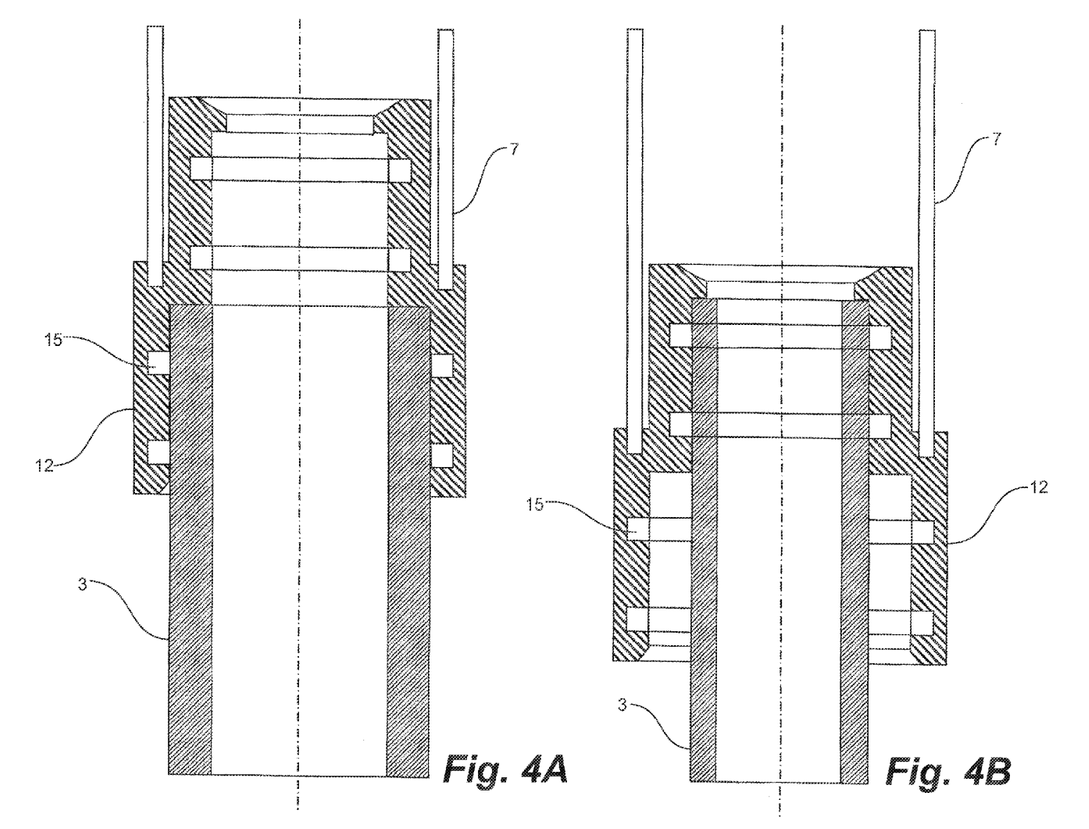
FIGS. 4A and 4B are partial cross-sectional views of a fitting adapter having multi-diameter bores for adapting to various sized pipe ends, FIG. 4A illustrating fitment over a pipe end having a first outer diameter and FIG. 4B illustrating fitment over a pipe end having a second outer diameter.

In one embodiment, as shown in FIGS. 4A and 4B, one universal fitting adapter 12 is sized to fit over pipe ends of various outer diameters. The bore 14 of the fitting adapter 12 comprises a plurality of stepped inner diameters for fitting various standard-sized pipe ends. Each smaller inner diameter is spaced sequentially upwardly from the previous. The ball 11 is sized for the smallest diameter. One or more annular grooves are provided in the bore 14 for locating the annular sealing elements or O-rings 15. Sealing elements are typically only installed in the appropriate inner diameter for the corresponding pipe end to be retrofitted. For example, sealing elements would not be fit to the smaller of two inner diameters if the retrofit was intended for a pipe end fit to the larger inner diameter and vice versa. Typically, the fitting adapter 12 can be sized for a particular intake, such as either a 8.9 or 11.4 centimeter (typically schedule 40 pipe), or provided with two or more sizes, such as for adapting to a 8.5 centimeter, or a 11.4 centimeter or other size pipe end.

Figure 7A:
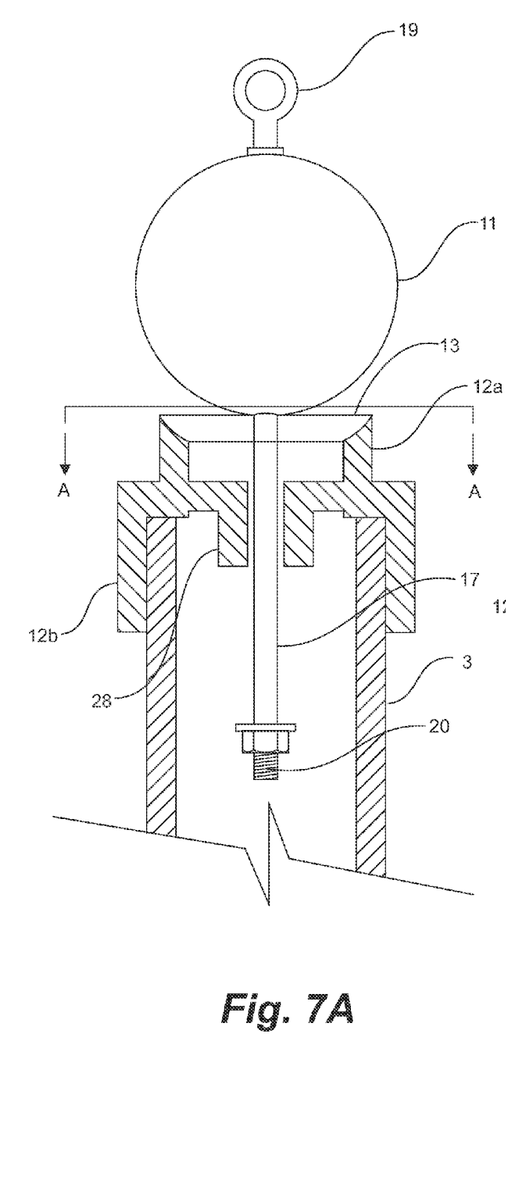
FIG. 7A is a partial cross-sectional view illustrating another embodiment of a valve assembly absent a cage.
Figure 7B:
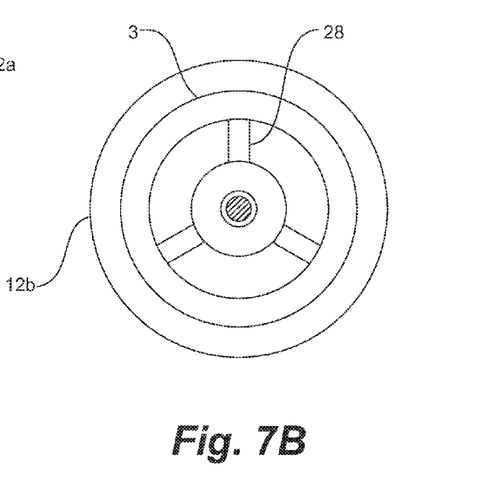
FIG. 7B is a cross-sectional top view taken along line A-A in FIG. 7A.

FIGS. 7A and 7B illustrate another embodiment of a valve assembly 6. The valve assembly 6 of this embodiment is substantially similar to the valve assembly 6 described with reference to FIGS. 2A$_1$ to 6C except for the configuration of the guide structure. In this embodiment, the ball 11 and the guide rod 17 are supported and guided by a boss or guide support in the fitting adapter 12.

With reference to FIGS. 7A and 7B, the ball 11 is supported and guided by the guide rod 17 which in turn is supported by the fitting adapter 12. The fitting adapter 12 is modified to support the guide rod 17 therein. The fitting adapter 12 comprises a guide support 28 in the bore 14. The ball 11 is coupled to the guide rod 17 so that the ball 11 moves with the guide rod 17 as a single unit. The guide rod 17 is disposed axially and moveably in the guide support 28. The guide support 28 is suspended in the bore 14 but minimally interferes with flow thereby. The valve assembly 6 is then fit over the pipe end 3 by locating the bore 14 over the pipe end 3 and the ball 11 floats and moves vertically with the guide rod in the tank 1 to modulate between the open position and closed position. The guide rod 17 can again be fit with a connector 19 and can be manually manipulated for lifting the ball 11 from the valve seat 13 for permitting flow through the pipe end 3.

The embodiments of the invention for which an exclusive property or privilege is claimed are defined as follows:

1. A method for remotely installing a float valve assembly to a pipe end located in a tank comprising liquid, the method comprising:
    lowering the valve assembly into the tank through an access in the tank; and
    locating a fitting adapter of the valve assembly over the pipe end, after location of the fitting adapter over the pipe end, a floating valve element of the valve assembly is located above the pipe end, and wherein
        during operation the valve element is manually spaced away from the pipe end by
        manipulating one end of a guide rod protruding out of a cage of the valve assembly and operably coupled to the floating valve element for spacing the valve element away from the pipe end to an open position for permitting flow of liquid through the pipe end; and
        locking the valve element in the open position.

2. A method for remotely installing a float valve assembly to a pipe end located in a tank comprising liquid, the method comprising:
    lowering the valve assembly into the tank through an access in the tank by temporarily supporting the valve assembly on an installation tool and lowering both the installation tool and the supported valve assembly through the access; and
    locating a fitting adapter of the valve assembly over the pipe end by axially aligning a bore of the fitting adapter and the pipe end and pressing the fitting adapter over the pipe end for sealably engaging the fitting adapter to the pipe end, and wherein after location of the fitting adapter over the pipe end, a floating valve element of the valve assembly is located above the pipe end.

3. The method of claim 2 further comprising disengaging the installation tool from the valve assembly.

4. The method of claim 2 wherein an inner diameter of the bore matches an outer diameter of the pipe end and wherein, before lowering the valve assembly, the method further comprises:
    fitting the bore with one or more annular sealing elements for sealable engagement with the pipe end.

5. The method of claim 4 wherein the inner diameter of the bore comprises two or more stepped inner diameters corresponding to two or more sizes of pipe ends and wherein, before lowering the valve assembly, the method further comprises:
    fitting the bore of at least one stepped inner diameters with the one or more annular sealing elements for sealable engagement with the pipe end.

6. The method of claim 5 further comprising aligning the bore over the pipe end and pressing the fitting adapter axially over the pipe end until the bore of the corresponding stepped inner diameter engages the pipe end for sealable engagement with the pipe end.

7. The method of claim 2 further comprising a step of manually spacing the valve element away from the pipe end, the step comprising:
    manipulating one end of a guide rod protruding out of a cage of the valve assembly and operably coupled to the valve element for spacing the valve element away from the pipe end to an open position for permitting flow of the liquid through the pipe end; and
    locking the valve element in the open position.

8. The method of claim 7, wherein manipulating the one end of the guide rod comprises temporarily coupling the installation tool to the one end for manually lifting the guide rod and the valve element away from the pipe end.

9. The method of claim 7, wherein the locking of the valve element in the open position further comprises:
aligning a laterally extending tab located on the guide rod above the valve element with a corresponding cut-out provided in a covering lid of the valve assembly;
lifting the guide rod until the tab on the guide passes through the cut-out in the covering lid;
rotating the guide rod after the tab has passed through the cut-out for misaligning the tab with the cut-out on an outer surface of the covering lid to prevent axial movement of the guide rod and the valve element towards a valve seat.

10. A float valve assembly for a pipe end immersed in a liquid, the valve assembly comprising:
a tubular cage comprising a connection end and a closed end, the closed end being closed with a closing member, the cage further comprising a spring connected to an inside surface of the closing member;
a guide rod disposed axially in the cage and operably coupled to a floating valve element such that the valve element can float and move vertically within the cage between an open position and a closed position,
one end of the guide rod protruding out of the cage through an opening in the closing member and moveable through the opening, the guide rod further comprising a stop located below the valve element for limiting axial movement of the valve element along the guide rod and a laterally extending tab located above the valve element;
the closing member further comprising a cut-out extending radially from the opening and corresponding to the tab;
a valve seat associated with the valve element located about the connection end;
wherein
the valve assembly is sealably located over the pipe end at the connection end and the valve element is seated on the valve seat in the closed position for preventing flow of the liquid through the pipe end;
the tab on the guide rod is aligned with the cut-out in the closing member and the valve element is manually moved away from the valve seat to the open position for permitting flow of the liquid through the pipe end by lifting the guide rod and pulling the valve element away from the valve seat, upward movement of the valve element compressing the spring and pushing the tab through the cut-out, and
the valve element is locked in the open position by rotating the guide rod after the tab has passed through the cut-out to misalign the tab with the cut-out on an outer surface of the closing member.

11. The valve assembly of claim 10, wherein one end of the guide rod protrudes out of the cage through the opening in the closing member.

12. The valve assembly of claim 10 wherein the tab is trapezoidal in cross section to facilitate movement of the tab through the cut-out.

13. The valve assembly of claim 10, wherein
the liquid comprises a lighter liquid floating over a heavier liquid and the valve element is a specific gravity-sensitive floating valve element,
the valve element has an effective specific gravity enabling the valve element to float in the heavier liquid at which the valve element is in the open position, and
sink in the lighter liquid at which the valve element is in the closed position.

14. The valve assembly of claim 13, wherein the effective specific gravity of the valve element can be altered by adding or removing ballast to a volume of the valve element through an access port provided on the valve element.

15. The valve assembly of claim 10, wherein:
the valve element is secured to the guide rod, the valve element and the guide rod axially moveable in the cage as a single element, and
wherein an effective specific gravity of the single element can be altered by adding or removing ballast to a volume of the guide rod through an access port provided on the valve element.

16. The valve assembly of claim 10 further comprising a fitting adapter connected at the connection end of the cage, the fitting adapter comprising a valve portion and a pipe end portion and wherein the valve seat is defined within the valve portion of the fitting adapter.

17. The valve assembly of claim 16 further comprising:
a connector at the one end of the guide rod;
for temporarily connecting with an installation tool for remotely controlling fitment of the fitting adapter over the pipe end and movement of the guide rod for manually moving the valve element away from the valve seat to the open position.

18. The valve assembly of claim 16, wherein the pipe end portion of the fitting adapter further comprises:
a bore corresponding in diameter to the pipe end for passage of liquid through the bore, the bore having at least one annular groove for receiving an annular sealing element.

19. The valve assembly of claim 18 wherein the annular sealing element is made of water swellable ethylene propylene diene terpolymer.

20. The valve assembly of claim 18 wherein the bore is a multi-diameter bore for fitting various sized pipe ends.

21. The valve assembly of claim 16, wherein:
the pipe end portion of the fitting adapter comprises a bore corresponding to a diameter of the pipe end and the guide rod; and
wherein the guide rod along with the valve element moves vertically between the open position and the closed position.

* * * * *